United States Patent [19]

Planz

[11] 3,821,348

[45] June 28, 1974

[54] PROCESS FOR RECOVERING NITRILE POLYMER SOLIDS FROM LATEX

[75] Inventor: Paul E. Planz, North Randall, Ohio

[73] Assignee: The Standard Oil Company, Cleveland, Ohio

[22] Filed: Feb. 25, 1972

[21] Appl. No.: 229,508

[52] U.S. Cl............ 264/182, 260/29.6 PT, 260/821, 260/822, 260/876, 264/176 R, 264/184
[51] Int. Cl. ............................................. D01f 7/00
[58] Field of Search ............ 264/176 F, 182, 184, 9; 260/876 R, 29.6 PT, 29.6 PM, 29.6 AN, 29.6 R, 95, 96, 821, 822

[56] References Cited
UNITED STATES PATENTS

| | | | |
|---|---|---|---|
| 1,989,241 | 1/1935 | McGavack | 260/822 |
| 3,248,455 | 4/1966 | Harsch et al. | 260/876 R |
| 3,318,831 | 5/1967 | Gauslaa | 260/29.7 PT |
| 3,345,430 | 10/1967 | Simon et al. | 260/876 R |
| 3,459,693 | 8/1969 | Halper et al. | 260/29.7 PT |
| 3,529,936 | 9/1970 | Muller-Rid et al. | 260/821 |
| 3,573,243 | 3/1971 | Bennett | 260/821 |
| 3,700,622 | 10/1972 | Terenzi | 260/876 R |

FOREIGN PATENTS OR APPLICATIONS

| | | | |
|---|---|---|---|
| 1,013,736 | 12/1965 | Great Britain | 260/29.7 PT |

*Primary Examiner*—Jay H. Woo
*Attorney, Agent, or Firm*—John F. Jones; Sherman J. Kemmer

[57] ABSTRACT

Nitrile polymer solids, such as an acrylonitrile-methyl acrylate copolymer prepared in emulsion in the presence of a diene rubber, are recovered from the latex by mechanical shearing of the latex to form a paste followed by shaping and contacting the shaped paste with a hot water medium.

2 Claims, No Drawings

PROCESS FOR RECOVERING NITRILE POLYMER SOLIDS FROM LATEX

This invention relates to a process for isolating and recovering latex solids and more particularly pertains to a process for the recovery of substantially moisture-free and otherwise uncontaminated polymers in the form of discreet particles of any desired predetermined size.

In the recovery of resin from latex solids, it is usually necessary or desirable to conduct the process in such a manner that the recovered solids will be the desired resin which is substantially free of moisture and contaminants, such as emulsifying agents, electrolytes, and water-soluble salts, and will have a particle size and form suitable for subsequent fabrication operations to be performed on the resin. It is also essential that the recovery of the resin from the latex be done as economically as possible particularly in terms of time and cost of materials used.

Many techniques are known which permit the recovery of resin solids from their latices and much of this prior technology is in the natural rubber and synthetic rubber and resin fields. The well known prior art techniques for recovering polymer solids using electrolytes, alcohols, etc., as coagulants work quite well, but in many instances the coagulated polymer is composed of a wide variety of particle sizes which often include a considerable proportion of very fine particles which are difficult if not impossible to purify and recover by conventional filtering or screening means.

It has been proposed previously, in U.S. Pat. Nos. 3,248,455 and 3,345,430, to prepare certain dry polymer solid particles of controlled particle size by first partially coagulating the polymer latex with electrolyte to form a "paste", then shaping the paste and passing the shaped mass into an aqueous medium which is maintained at a temperature at least as high as the heat distortion temperature of the recovered polymer. Such a process involves adding electrolyte to the polymer latex and ultimately washing the electrolyte and the contaminants from the polymer in an aqueous medium.

I have discovered a process which is applicable to certain high-nitrile polymers, which are hereinafter more fully described, and which involves subjecting the latices of said polymers to shear and, if desired, elevated temperatures in the absence of any added electrolyte to form a paste, and then shaping this paste and passing the shaped paste into an aqueous medium which is maintained at an elevated temperature. My process is successfully carried out without the electrolyte coagulant required in the prior art processes and in this respect is indeed unobvious and unexpected.

An object of this invention is to provide a novel process for recovering latex solids which alleviates the need for conventional electrolyte coagulants and requires no adjustment of solids or water content of the latex.

Another object is to provide a process which permits the recovery of substantially moisture-and-electrolyte-free polymers having a controlled particle size and particle size distribution from latices of polymers which are hereinafter more fully described.

The polymer latices useful in this invention may contain a polymer which results from the polymerization in emulsion of a major proportion of an olefinically unsaturated nitrile, optionally another monomer component and a preformed rubber component by methods well known to those skilled in the art.

In the process of this invention the polymer latex is sheared in any of many well known devices, such as colloid mills, Waring blenders, high-speed propeller mixers, pumps having nozzles, orifices or other restrictions, etc., to form a paste having a consistency resembling toothpaste. This paste is then formed into one or more shaped units preferably having a minimum cross-sectional dimension of about 0.01 of an inch and heating the shaped paste in an aqueous medium maintained at an elevated temperature preferably maintained near or above the ASTM (test D-648-56) heat distortion temperature of the polymer. The hot aqueous treatment serves to harden the shaped paste into a solid mass of about the same size and shape as the formed paste had before it entered the bath. The hardened particles are then easily recovered, washed if desired, and dried to a substantially coherent moisture-and-electrolyte-free resin particle.

The term "shear" is understood to mean an internal force tangential to the section on which it acts and is a shearing force. Shearing is an action or stress resulting from applied forces which causes or tends to cause two contiguous parts of a body of latex to slide relatively to each other in a direction parallel to their plane of contact.

The invention also includes the extrusion of such paste through a fine orifice to form a thin (e.g., 1/100 to ¼ of an inch in diameter as well as larger sizes, depending on the size of the orifice) rod or strand. Such a rod or strand has the same composition as the paste, that is the rod or strand contains in uniform admixture the entire solids content and water content of the latex which was sheared to form the paste in the first instance.

In typical practice of the invention, the resulting shaped strands or rods of the shear-coagulated latex paste are dropped into gently agitating hot water. The resulting integral particles are easily washed, separated, and dried with great efficiency and with little or no loss in the form of fines.

Usually the latex (or blend of latices) used in the invention will contain 20 to 45 percent solids and will have average particle sizes ranging from 500 to 3,000 Angstroms. The solids content of the paste is essentially the same as the solids content of the starting latex.

The production of a shaped particulate material that is substantially free of fines is made possible by that feature of the invention whereby the particles, as originally shaped, have sufficient structural strength to remain integral during the operation of syneresis (hardening or agglomeration in hot water) and washing.

The procedure described enables unusually efficient washing since large particles are hard to wash properly. It also means that the drying operation can therefore be accomplished expeditiously. Excessively large particles take a long time to dry and they tend to case harden on the outside. Also, the prolonged or severe drying conditions necessary with excessively large particles tend to lead to deterioration of the polymer during drying.

The polymers which are most useful in the process of this invention include those produced by polymerizing a major proportion of a monounsaturated nitrile, such as acrylonitrile, and optionally a minor proportion of another monovinyl monomer component copolymerizable with said nitrile in an aqueous medium in the presence of a preformed diene rubber which may be a homopolymer or a copolymer of a conjugated diene monomer.

The esters of olefinically unsaturated carboxylic acids include those having the structure

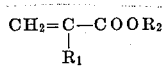

wherein $R_1$ is hydrogen, an alkyl group having from one to four carbon atoms, or a halogen, and $R_2$ is an alkyl group having from one to six carbon atoms. Compounds of this type include methyl acrylate, ethyl acrylate, the propyl acrylates, the butyl acrylates, the amyl acrylates, and the hexyl acrylates; methyl methacrylate, ethyl methacrylate, the propyl methacrylates, the butyl methacrylates, the amyl methacrylates, and the hexyl methacrylates; methyl alpha-chloroacrylate, ethyl alpha-chloroacrylate, and the like. Most preferred in the present invention are methyl acrylate, ethyl acrylate, methyl methacrylate, and ethyl methacrylate.

The alpha-olefins useful in the present invention are those having at least four and as many as ten carbon atoms and having the structure

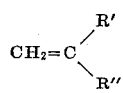

wherein R' and R'' are alkyl groups having from one to seven carbon atoms, and more specifically preferred are alpha-olefins such as isobutylene, 2-methyl butene-1, 2-methyl pentene-1, 2-methyl hexene-1, 2-methyl heptene-1, 2-methyl octene-1, 2-ethyl butene-1, 2-propyl pentene-1, and the like. Most preferred is isobutylene.

The conjugated diene monomers useful in the present invention include butadiene-1,3, isoprene, chloroprene, bromoprene, cyanoprene, 2,3-dimethyl-butadiene-1,3, 2-ethyl-butadiene-1,3 2,3-diethyl butadiene-1,3, and the like, and others. Most preferred for the purpose of this invention are butadiene-1,3 and isoprene because of their ready availability and their excellent copolymerization properties.

The olefinically unsaturated nitriles useful in the present invention are the alphaa, beta-olefinically unsaturated mononitriles having the structure

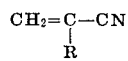

wherein R is hydrogen, a lower alkyl group having from one to four carbon atoms, or a halogen. Such compounds include acrylonitrile, alpha-chloroacrylonitrile, alpha-fluoroacrylonitrile, methacrylonitrile, ethacrylonitrile, and the like. The most preferred olefinically unsaturated nitriles in the present invention are acrylonitrile and methacrylonitrile and mixtures thereof.

The other monovinyl monomer component copolymerizable with the olefinically unsaturated nitriles which is useful in this invention includes one or more of the esters of olefinically unsaturated carboxylic acids, vinyl esters, vinyl ethers, alpha-olefins, vinyl aromatic monomers, and others.

The vinyl ethers include methyl vinyl ether, ethyl vinyl ether, the propyl vinyl ethers, the butyl vinyl ethers, methyl isopropenyl ether, ethyl isopropenyl ether, and the like. Most preferred are methyl vinyl ether, ethyl vinyl ether, the propyl vinyl ethers, and the butyl vinyl ethers.

The vinyl esters include vinyl acetate, vinyl propionate, the vinyl butyrates, and the like. Most preferred is vinyl acetate.

The vinyl aromatic monomers include styrene, alpha-methyl styrene, the vinyl toluenes, the vinyl xylenes, and the like. Most preferred is styrene.

Polymerizates of particular utility in this invention and details of their method of preparation are described in U.S. Pat. Nos. 3,426,102 and 3,586,737 and in the co-pending U.S. patent application of Russell K. Griffith et al, Ser. No. 222,979 filed Feb. 2, 1972, all of these references being incorporated herein in their entirety.

Specific polymerizates useful in the process of this invention include those prepared by the polymerization of 100 parts by weight of (A) at least 50 percent by weight of at least one nitrile having the structure

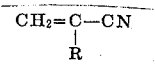

wherein R has the foregoing designation and (B) up to 50 percent by weight based on the combined weights of (A) and (B) of at least one member selected from the group consisting of (1) an ester having the structure

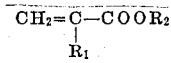

wherein $R_1$ and $R_2$ have the foregoing respective designations, (2) an alpha-olefin having the structure

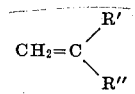

wherein R' and R'' have the foregoing respective designations, (3) a vinyl ether selected from the group consisting of methyl vinyl ether, ethyl vinyl ether, the propyl vinyl ethers, and the butyl vinyl ethers, (4) vinyl acetate, and (5) styrene, optionally in the presence of from 1 to 40 parts by weight of (C) a rubbery polymer of a conjugated diene monomer selected from the group consisting of butadiene and isoprene and optionally a comonomer selected from the group consisting of styrene and a nitrile monomer having the structure

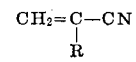

wherein R has the foregoing designation, said rubbery polymer containing from 50 to 100 percent by weight of polymerized conjugated diene and from 0 to 50 percent by weight of comonomer.

Preferably, component (A) should be present in from about 60 to 90 percent by weight based on the combined weights of (A) and (B) and the rubbery polymer (C) should contain more than 50 percent by weight of conjugated diene and more preferably from 60 to 90 percent by weight of the conjugated diene.

The polymerizates useful in the process of this invention can contain compounding ingredients and additives, pigments, colorants, stabilizers, etc., as is well known in the art, so long as the balance between impact strength, flexural strength, tensile strength, processability, heat distortion temperature, and the like is not affected to such a degree that the article is no longer useful for its intended purpose.

The polymers useful in the process of this invention are thermoplastic materials which are easily processed and can be thermoformed into a wide variety of useful articles in any of the conventional ways employed with well known thermoplastic polymeric materials such as by extrusion, milling, molding, drawing, blowing, etc. The polymers resulting from the process of this invention have excellent solvent resistance, including water-frost resistance, and their impact strength (when rubber modified) and low permeability to gases and vapors make them very useful in the packaging industry, and they are particularly useful in the manufacture of bottles, films, envelopes, boxes, and other types of containers for liquids and solids.

In the following examples, which will further illustrate this invention, the amounts of the various ingredients are given in parts by weight unless otherwise specified.

EXAMPLE 1

A. A rubber latex was prepared by polymerizing with continuous agitation at 45°C in the substantial absence of oxygen a mixture of the following ingredients:

| Ingredient | Parts |
| --- | --- |
| acrylonitrile | 30 |
| butadiene-1,3 | 60 |
| emulsifier (GAFAC RE-610)* | 2.4 |
| azo-bis-isobutyronitrile | 0.3 |
| t-dodecyl mercaptan | 0.5 |
| water | 200 |

*A mixture of $R-O-(CH_2CH_2O-)_nPO_3M_2$ and $[R-O-(CH_2CH_2O-)_n]_2PO_2M$ wherein n is a number from 1 to 40, R is an alkyl or alkaryl group and preferably a nonyl phenyl group, and M is hydrogen, ammonia or an alkali metal, which composition is sold by GAF Corporation.

Before reaction was started, the pH of the mixture was adjusted to about 8 with KOH. The polymerization was carried out for 22 and ½ hours to a conversion of about 92 percent and a total solids of about 33.1 percent.

B. An impact-resistant, gas barrier resin was prepared by polymerization of a mixture of the following ingredients:

| Ingredient | Parts |
| --- | --- |
| acrylonitrile | 75 |
| methyl acrylate | 25 |
| rubber solids in the form of latex A (above) | 9 |
| potassium persulfate | 0.06 |
| emulsifier (GAFAC RE-610) | 3.0 |
| modifier (n-Dodecyl Mercaptan) | 1.0 |
| ethylene diamine tetra acetic acid | 0.05 |
| water | 200 |

The pH was adjusted to about 7 with $NH_4OH$. The polymerization was carried out in the substantial absence of oxygen at 60°C for 5 hours so as to produce a conversion of 91 percent of a latex. The latex obtained from the polymerization was then passed through a container which contained a high-speed mixer. The container-mixer system was similar to that of a Waring blender, in-line dispersator, or other high-shear mixing equipment. The latex remained inside the container for an average of approximately 15 seconds. The produce from the container-mixter system had a consistency similar to that of toothpaste. This product was then extruded through a fine orifice (1/16 of an inch in diameter) plate to form a thin rod or strand. The rod was then dropped into gently agitating hot (80°C) water. The rods or strands were allowed to remain in the hot water for approximately 10 minutes. The resulting polymer was washed, dried, and compression molded into a bar at 150°C. The molded bar was transparent and found to have a notched Izod impact strength of 1.2 foot pounds per inch of notch and ASTM heat distortion temperatures of 69°C at 264 psi and 75°C at 66 psi by ASTM test D-648-56. The polymer was easily blended in a Brabender plasticorder and at the end of 10 minutes in the plasticorder at 230°C and 35 rpm, a torque reading of 1,150 meter grams was obtained for the polymer. A sample of this polymer was compression molded into a sheet and this sheet was found to have a water vapor transmission of 4.51 grams/mil/100 inches$^2$/24 hours at 90 percent relative humidity and 100°F by ASTM procedure E-96. The sheet was found to have an oxygen transmission of 0.6 cc/mil/100 inches$^2$/24 hours/atmosphere by ASTM procedure D-1434. The sheet was also found to hvae a frosting index of 6.4 haze units. Frosting index was obtained by measuring the haze or refracted light off the piece of the sheet. The sheet was then subjected to a temperature of 50°C and 100 percent relative humidity for 16 hours at which time the haze was redetermined. The difference in the haze readings is the frost index. The haze readings were done on a Hunter Laboratories color difference meter model D-25-P.

C. Steps A and B were repeated except that the resulting resin was isolated from the latex by coagulation with dilute aqueous aluminum sulfate which is outside the scope of this invention. The resulting resin was then shaped into a thin rod or strand (1/16 of an inch in diameter) and dropped into gently agitating hot (80°C) water. The rods or strands were allowed to remain in the hot water for 10 minutes. The resulting polymer was washed, dried, compression molded into a bar at 150°C. The molded bar was transparent and found to have a notched Izod impact strength of 1.2 foot pounds per inch of notch and ASTM heat distortion temperatures of 65°C at 264 psi and 70°C at 66 psi. The polymer was easily blended in a Brabender plasticorder and at the end of 10 minutes in the plasticorder at 230°C and 35 rpm, a torque reading of 1,150 meter grams was obtained for the polymer. A sample of this polymer was compression molded into a sheet and this sheet was found to have a water vapor transmission of 5.64 grams/mil/100 inches$^2$/24 hours at 90 percent relative humidity and 100°F by ASTM procedure E-96. The sheet was found to have an oxygen transmission of 0.6 cc/mil/100 inches$^2$/24 hours/atmosphere by ASTM procedure D-1434. The sheet was found to have a frosting index of 20.6 haze units and to have a much deeper yellowness than that obtained by procedure B above.

EXAMPLE 2

A resin was prepared and isolated by the procedure of Example 1-A and 1-B with the exception that 80 parts of acrylonitrile and 20 parts of methyl acrylate were used in B in place of the 75 parts of acrylonitrile and 25 parts of methyl acrylate. The final resin was found to have a notched Izon impact strength of 3 foot pounds per inch of notch, an ASTM heat distortion temperature of 80°C, and a Brabender plasticorder torque of 1,250 meter grams.

EXAMPLE 3

A resin was prepared and isolated by the procedure of Example 1-A and 1-B with the exception that 70 parts of acrylonitrile, 17 parts of methacrylonitrile, and 13 parts of methyl acrylate were used in B in place of the 75 parts of acrylonitrile and 25 parts of methyl acrylate. The product was found to have a notched Izod impact strength of 3 foot pounds per inch of notch, an ASTM heat distortion temperature of 77°C, and a Brabender plasticorder torque of 1,600 meter grams.

EXAMPLE 4

A copolymer of acrylonitrile and methyl acrylate was prepared at 60°C to essentially complete conversion from a mixture of the following ingredients:

| Ingredient | Parts |
| --- | --- |
| water | 156 |
| acrylonitrile | 75 |
| methyl acrylate | 25 |
| emulsifier (GAFAC RE-610) | 3 |
| modifier (Mercaptate Q-43)* | 1.05 |
| ammonia | 0.06 |
| chelating agent (Hampene K-4-100)** | 0.05 |

*The tetra ester of pentaerythritol and beta-mercaptopropionic acid.
**The tetra potassium salt of ethylene diamine tetra acetic acid.

The polymerization was carried to about 99 percent conversion giving a latex having about 31 percent solids. About 250 mls. of this latex were placed in a glass container and were warmed to about 58°C. The warmed latex was then added to a Waring blender and was agitated with the high-speed blender blade for 15 seconds to produce a paste. This paste was extruded through an orifice (1/16 of an inch in diameter) to form a strand which was dropped into gently agitated hot (80°C) water and the rods or strands were left in the hot water for aabout 10 minutes. Some of the resulting polymer was washed, dried and compression molded into test bars at 150°C. The test bar was found to have a notched Izod impact strength of 0.37 foot pounds per inch of notch and a Brabender plasticorder torque of 1,300 meter grams.

EXAMPLE 5

A resin was prepared by the polymerization of the following ingredients:

| Ingredient | Parts |
| --- | --- |
| distilled water | 250 |
| emulsifier (Alipal CO 436)* | 1.5 |
| acrylonitrile | 75 |
| methyl acrylate | 25 |
| limonene dimercaptan | 0.5 |
| $(NH_4)_2S_2O_8$ | 0.06 |
| butadiene | 12.0 |

*Ammonium salt of sulfated nonylphenoxypoly (ethyleneoxy) ethanol.

All the above ingredients, with the exception of the butadiene, were charged to a reactor, oxygen was removed by nitrogen sweeping, and the stirred polymerization was carried out at 60°C until 89.5 percent of the monomer was converted to polymer. At this point all of the butadiene was added and the polymerization was continued to a final conversion of 93 percent. The resin was recovered from the latex by the procedure described in Example 1-B. The final resin was found to have the following properties:

| | |
| --- | --- |
| notched Izod impact strength | 6.3 foot pounds per inch of notch |
| Brabender plasticorder torque | 1890 meter grams |
| ASTM heat distortion temperature | 70°C |
| flexural strength | $13 \times 10^3$ psi |
| flexural modulus | $4.8 \times 10^5$ psi |
| tensile strength | $9.9 \times 10^3$ psi |
| hardness, Rockwell "M" | 69 |

I claim:

1. The process for recovering solids from a polymeric latex of a polymer produced by the polymerization in aqueous emulsion of a major proportion of an unsaturated nitrile, a preformed rubber component and optionally a minor proportion of at least one other polymerizable component consisting essentially of shearing said latex in the absence of any added electrolyte and in a shearing device such as a colloid mill, Waring blender, high-speed propeller mixer, or a pump having a nozzle, orifice, or other restriction until a homogeneous, form-sustaining paste having a consistency resembling toothpaste is obtained, forming said paste into a shaped unit and heating the shaped unit in an aqueous bath maintained at an elevated temperature to harden and synerize the unit and then recovering the unit.

2. The process of claim 1 wherein the unsaturated nitrile is a member selected from the group consisting of acrylonitrile and methacrylonitrile.

* * * * *